[54] HOOP STRESSED BEAM HYDROPHONE

[72] Inventor: Billy W. Davis, Flagstaff, Ariz.

[73] Assignee: Schlumberger Technology Corporation, New York, N.Y.

[22] Filed: Dec. 28, 1970

[21] Appl. No.: 101,873

[52] U.S. Cl. ..................................340/10, 310/9.1, 340/8 S
[51] Int. Cl. ..........................................................G01v 1/16
[58] Field of Search ........................340/7, 8, 10; 310/8.5, 9.1

[56] References Cited

UNITED STATES PATENTS 2,788,513  4/1957  Howes....................................340/7 R
3,489,994  1/1970  Massa.......................................340/10

[15] 3,675,193
[45] July 4, 1972

Primary Examiner—Benjamin A. Borchelt
Assistant Examiner—H. Kinberg
Attorney—Arnold, White & Durkee, Tom Arnold, Bill Durkee, John F. Lynch, Louis T. Pirkey, Frank S. Vaden, III, Robert A. White, Ernest R. Archambeau, Jr., David L. Moseley, Edward M. Roney, William R. Sherman, William J. Beard and Stewart F. Moore

[57] ABSTRACT

Seismic hydrophone streamer assemblies are constructed utilizing hydrophones which comprise cylindrical segments of crystals disposed with the axis of the crystals transverse to the axis of the streamer cable. This construction permits usage of a crystal having a diameter significantly larger than the diameter of the cable regardless of whether the crystal is disposed internally of a streamer cable. A crystal mounting means is provided which can be affixed to the exterior of a central stress member streamer cable and which supports the crystal solely by the edge of the crystal segment parallel to the cylindrical axis of the cylinder.

21 Claims, 4 Drawing Figures

Patented July 4, 1972  3,675,193

Billy W. Davis
INVENTOR

BY Arnold, White & Durkee

ATTORNEYS

HOOP STRESSED BEAM HYDROPHONE

BACKGROUND OF THE INVENTION

The present invention relates generally to seismic exploration of substrata beneath bodies of water and more particularly to apparatus in the nature of a seismic hydrophone streamer that may be towed through bodies of water and may be controlled to receive and measure reflected seismic waves that may be generated by the towing vessel or may be generated by explosions or by any other desirable method.

Marine seismic exploration is often conducted by towing a seismic streamer at a given depth through the ocean or other body of water. The seismic streamer is provided with a plurality of sound sensitive transducers, i.e., hydrophones, disposed at appropriate intervals along the length thereof that are capable of receiving reflected sounds or waves generated by the towing vessel or otherwise and transmitting the same in the form of converted electrical signals to an appropriate facility that receives the signals and records them in some form.

Seismic streamers are typically constructed by encapsulating hydrophones within or about the periphery of an elongated streamer that may be composed of a central stress member such as a load bearing cable about which is disposed a plurality of signal transmitting wires from the hydrophones, generally referred to as a signal wire bundle. The hydrophones are, for the most part, encapsulated in a body of resilient material defining a generally cylindrical external streamer configuration which allows the streamer to be towed through the water in smooth and noiseless manner.

The selection of the frequency response range of the hydrophones, their spacing and the like, is largely dependent upon the particular survey being made. Hence it would be desirable to provide, if possible, an efficient seismic streamer construction which would enable selective placement of hydrophones with the particular characteristics necessary to accomplish the survey at hand along a seismic streamer, thus to tailor the seismic streamer to the job.

Piezoelectric crystal transducers are often used in the hydrophone construction of seismic streamers. In particular, cylindrical crystal transducers are employed because of the comparative insensitivity of this configuration of crystal to hydrostatic pressures which might be encountered. At the same time, however, the cylindrical configuration of the crystal makes the tailoring of a seismic streamer difficult. It can further be appreciated that repair of a seismic streamer so constructed can be difficult since individual hydrophones cannot readily be removed for replacement or repair.

Although it is known that crystal sensitivity can be increased by increasing the crystal diameter, the transducer crystal diameter in the prior art designs is effectively limited by the diameter of the streamer cable. For if the crystals of the hydrophones are to be encapsulated within the cable, the diameter of the crystal must be necessarily less than that of the cable while even if the hydrophones were to be mounted exteriorly on a cable, the considerations of drag on the streamer preclude crystal diameters significantly larger than the cable diameter.

Hence design and development efforts have been expended in the recent past to produce a suitable split streamer hydrophone by utilizing a two piece sectionalized transducer crystal that could be fixed in assembly about the central stress member of a streamer. The split hydrophones that have been developed have sought to split the cylindrical crystal parallel to the cylindrical axis and dispose the split sections concentrically about the axis of the streamer. This design has not been acceptable for the most part because the splitting of the crystal impairs the performance of the transducer resulting in an unacceptable decrease in transducer sensitivity.

The relationship between crystal sensitivity and crystal radius is pointed out by Beden bender, et al., in the treatise entitled "Electroacoustic Characteristics of Marine Seismic Streamers," presented at the thirty-ninth annual meeting of the Society of Exploration Geophysics, Calgary, Canada, 1969. This treatise shows that the open-circuit sensitivity of a hoop-mode polarized piezoelectric crystal sealed at both ends with stiff end caps having air inside the cavity and operating well below resonance is given by the following expression:

$$S = -RK\left[g_{33}\frac{1-\alpha}{1+\alpha}(1+\alpha\beta) + g_{31}2\sigma^D\left(\frac{2(1-\alpha^2\beta)+(1-\beta)\alpha}{1+\alpha}\right)\right],$$

where
$R$ = outside radius of crystal,
$K = 10^5$ (converts n/m² to μ-bar),
$g_{33}$ = piezoelectric constant, volts-m/n,
$g_{31}$ = piezoelectric constant, volt-m/n,
$\alpha = I.D/O.D$
$\sigma D$ = Poisson's ratio of crystal, $$\beta = \frac{5 - 4\sigma^D}{(3-6\sigma^D)\alpha^2 + 2 + 2\sigma^D + \frac{Y^D}{B}(1-\alpha^2)},$$

$Y^D$ = Young's modulus of crystal, n/m², and
$B$ = bulk modulus of material inside cavity, n/m².

Thus it would appear logical that a hydrophone may be constructed with an extremely large degree of sensitivity as compared with a conventional hoop-stressed hydrophone, even though the overall size of the hydrophone structure remains quite small if the radius of cylindrical curvature is large.

SUMMARY OF THE INVENTION

It is accordingly an object of the present invention to provide a novel hydrophone assembly which can be readily affixed to a streamer cable to enable rapid customizing of a hydrophone streamer in accordance with the requirements of a particular survey.

It is a further object of the present invention to provide a novel hoop stressed beam hydrophone construction that allows simple, easy, and inexpensive repair operations that may be necessary for proper maintenance of the hydrophone system.

Among the several objects of the present invention is noted the contemplation of a novel hoop stressed hydrophone construction capable of high piezoelectric sensitivity while requiring a minimal amount of space for installation.

It is an even further object of the present invention to provide a novel hydrophone construction that lends itself not only to the application involving seismic streamers, but also involving bay cables, i.e., marsh phones, and anti-submarine warfare static arrays.

It is also among the several objects of the present invention to provide a novel hydrophone construction that achieves high levels of sensitivity while remaining relatively unaffected by the water depth i.e., hydrostatic pressure, at which the hydrophone construction is employed.

It is also another object of the present invention to provide a novel hoop stressed beam hydrophone construction that is simple in nature, reliable in use, and low in cost.

The above and other objects and novel features of the instant invention will be readily apparent from the following description taken in conjunction with the accompanying drawings. It is to be expressly understood that the drawings are provided for the purpose of illustration and are not intended to define the limits of the invention, but rather merely illustrate preferred embodiments and structures incorporating the features of the instant invention.

In summary, the instant invention provides a hydrophone streamer assembly including an elongated streamer cable having one or more crystal transducer hydrophones disposed thereon. The crystal transducers comprise a segment of a cylinder, and are mounted with respect to the cable with the cylindrical axis of the cylinder disposed transversely to the axis of the cable.

Preferably the crystal segment comprises a segment of a circular cylinder and is disposed within a mount with an elastomeric material disposed covering the outer crystal surface to enable the sound vibrations under water to be received by the crystal. The mount supports the crystal on its edges with an air space below the inner surface of the crystal thereby achieving the hoop stress mode of operation.

Although the novel hydrophone design is singularly adapted for exterior application on streamer cables, hydrophones in accordance with this invention can be encapsulated within streamer cables heretofore known in the art.

BRIEF DESCRIPTION OF THE DRAWINGS

In the accompanying drawings forming a part of the present application and wherein like reference numerals are employed to designate like parts.

DETAILED DESCRIPTION OF SPECIFIC AND PREFERRED EMBODIMENTS

Figure 1:
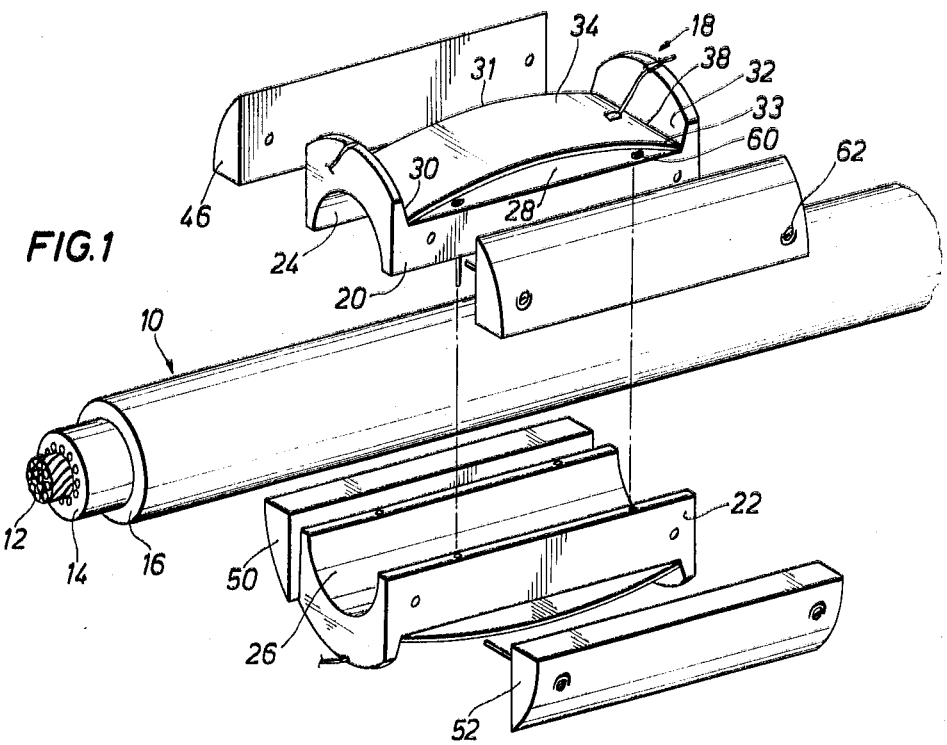
FIG. 1 is an exploded isometric view illustrating a streamer construction provided with a hydrophone constructed in accordance with the present invention.

With reference now to the drawings for a better understanding of the present invention, in FIG. 1 is disclosed a hydrophone streamer generally at 10 that includes a central stress bearing member 12 that may be a cable or any other suitable stress bearing member capable of withstanding the stresses applied to the streamer as it is towed by a vessel through a body of water. A plurality of electrical conductors 14 are disposed about the central stress member 12 and are generally referred to as a signal wire bundle. The electrical conductors are connected to appropriate ones of the plurality of hydrophones that may be located at preselected spaced intervals along the length of the streamer. An external covering of water impervious material 16 is disposed about the central stress member and signal wire bundle and serves to prevent contamination of the electrical connections by sea water or any other corrosive medium.

It will be understood that if the streamer cable is constructed with hydrophones in fixed position that the leads from the transducer crystals could be directly and permanently interconnected into the signal wire bundle at the time of construction. Alternatively the central member could be provided with a signal wire bundle with free leads running from the central bundle through the skin 10 of the central member at periodic intervals to enable affixation of hydrophones. Alternatively still an oil filled streamer or a solid streamer composed of neutral buoyancy material reinforced with a stress member might be employed. In these latter cases the signal wires could be run exteriorly of the central member to the towing vessel utilizing clips or the like if desired.

The hydrophone assembly is illustrated generally at 18 in FIG. 1. In most instances it is desirable to mount two opposing crystals in a single hydrophone assembly, the crystals being mounted in opposed relation. However, it will be appreciated that the hydrophone design as provided herein would be equally adaptable to use of a single crystal or to the use of multiple crystals, for example three or four crystals arranged in geometrical symmetry about the central member 10.

In the illustrated embodiment a pair of transducer crystal mounting blocks 20 and 22 are arranged in opposed relation around the streamer 10. The mounting blocks are composed of substantially rigid noncorrosive material. Preferred materials include any number of the noncorrosive rigid plastic materials known to the art. The support blocks 20 and 22 are each provided with a semicylindrical recess at 24 and 26, capable of receiving the streamer 10 in close fitting relation. Each of the support blocks 20 and 22 is provided with an elongated recess extending substantially along its length and terminating in a pair of diverging crystal support surfaces as shown at 30 and 32.

A piezoelectric crystal 34 is in the configuration of a segment of a cylindrical crystal tube, and has a generally curved outer surface. Most typically, and preferably, the crystal segment is the segment of a circular crystal cylinder, although a crystal segment of an elliptical cylinder or cylinder with a similar regularly curved outer surface might possibly be used.

The piezoelectric crystal segment 34 terminates in edge surfaces 36 and 38 which can be defined as generally parallel to the axis of the cylinder from which the segment was taken, and also in edges 31 and 33 which are generally perpendicular to the cylindrical axis.

Figure 4:
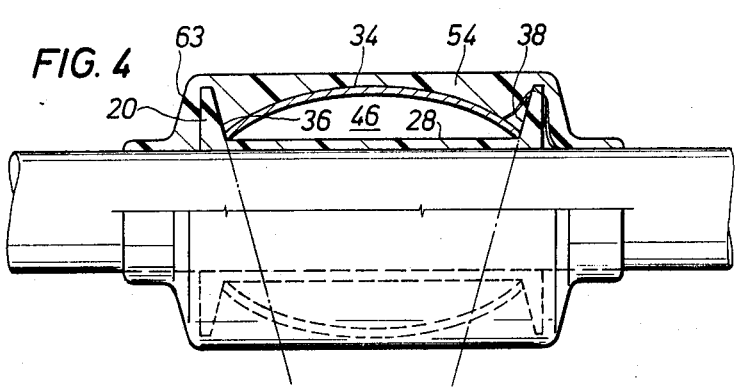
FIG. 4 is a sectional view of the streamer and hoop stressed beam hydrophone taken along line 4—4 in FIG. 2.

The crystal segment is disposed in the crystal mounts 20 and 22 with the axis of the cylindrical segment of the crystal transverse to the axis of the central member 10. By virtue of this construction, as can be seen in FIG. 4, it is possible to utilize a piezoelectric crystal having a radius of curvature much greater than the radius of the widest portion of the hydrophone-streamer assembly. In this manner the increased sensitivity which results from using crystals of increased diameter can be achieved without unduly increasing the diameter of the streamer assembly and suffering the bulkiness and increased drag of such a large diameter streamer.

Each crystal is typically provided with a contact plate 40 to which is connected a pair of electrical conductors 42 and 44 capable of conducting electrical signals generated by the crystal as vibration is induced in the crystal by underwater sounds or seismic waves.

Since the crystals 34 are spaced from the substantially planar surface 24 of the boat shaped mounting blocks with the convex surface of the crystals facing exteriorly of the axis of the streamer, a void or air space 46 is defined between the crystal and surface 28. The presence of air or another compressible fluid medium within the void or cavity 46 lends support to the crystal 34 thereby permitting the segmented crystal to function essentially as a hoop stressed crystal and substantially increasing the piezoelectric sensitivity thereof.

The mounting of the crystal is accomplished between divergent support surfaces 30 and 32 which abut and provide support for edge surfaces 36 and 38 of the crystal. Preferably in the cutting of the crystal, edge surfaces 36 and 38 are perpendicular to a tangent to the outer curved surface of the crystal at the edge. Thus in the preferred case where a crystal segment of a circular cylindrical crystal tube is used, edge surfaces 36 and 38 would be defined by radii of the cylinder intersecting the walls of the crystal. With the crystal mounted in this way, as hydrostatic pressure is applied to crystal 34 as it is submerged during use, the diverging support surfaces provide structural support to maintain deflection of crystal 34 similar to the deflection of a completely cylindrical crystal and hence assist crystal sensitivity. Completing the crystal mounting means, elongated side members 46, 48, 50 and 52 are disposed in interfitting relation with mounting blocks 20 and 22. In the illustrated embodiment the side blocks are so configured to give an overall cylindrical configuration to the hydrophone assembly. The side members may be permanently affixed to the mounting blocks with a suitable adhesive or the like, or, if desired, removable securing means such as screws or bolts may be employed to affix the side members to the mounting blocks. The transverse side members 46, 48, 50 and 52 are formed of a substantially rigid and noncorrosive material, and may be composed of the same or similar material to that which composes the mounting block structures.

Figure 2:
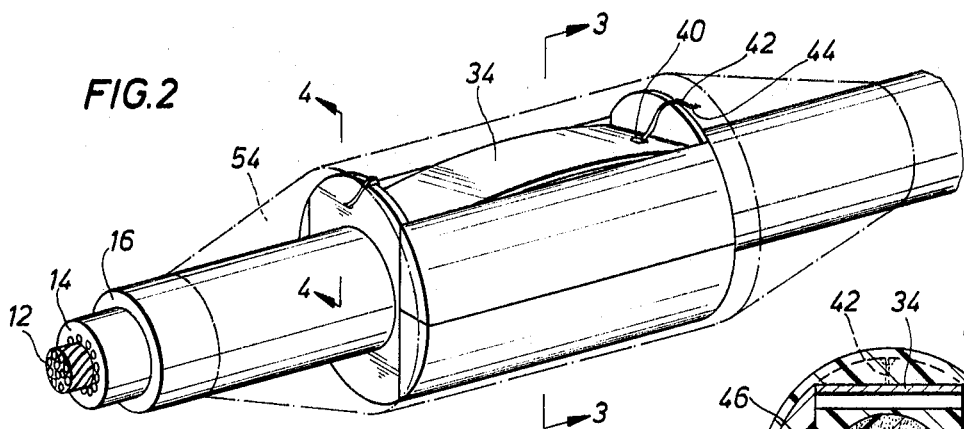
FIG. 2 is an isometric view of the streamer and hydrophone structure of FIG. 1 in assembled condition and illustrating the exterior covering of the streamer in broken line.
Figure 3:
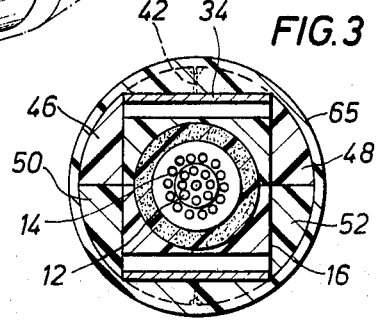
FIG. 3 is a sectional view taken along line 3—3 in FIG. 2.

The hydrophone structure is then provided with a thin covering 54 of an elastomeric material that is preferably corrosion resistant, oil resistant and impervious to water. As illustrated, the outer configuration of covering 54 contributes to the general cylindrical configuration of the hydrophone assembly. In those instances where hydrophones are to be affixed to the exterior of a central member, it may be desirable to provide a tapered segment as shown in dotted outline in the right-hand portion of FIG. 2 to create hydrophone enlargements on the central streamer cable which will provide a minimum of drag and hence can be pulled through the water with minimal effort and noise.

Alternatively, as indicated above, the hydrophone assemblies of this invention can be encapsulated within a streamer having a diameter substantially equal to that of the hydrophone assembly itself. Such a configuration is illustrated in the left-hand portion of FIG. 2. Since it is sometimes desirable to create hydrophone streamers of substantially neutral buoyancy, a uniform diameter hydrophone streamer assembly such as illustrated in dotted outline in the left-hand portion of FIG. 2 might be constructed using a negative buoyancy material outside central member 10 to render the entire hydrophone neutrally buoyant.

Alternatively, the hydrophones of the instant invention could be incorporated in known neutral buoyancy streamer assemblies such as illustrated in U. S. Pat. No. 3,480,907.

It will be obvious that a multitude of variations can be imposed upon the hydrophone construction as outlined herein. For example, the hydrophone construction illustrated generally at 18 could be assembled and encapsulated in a suitable water and oil impervious plastic coating with provision to affix this assembly to an opposed assembly around the streamer cable as generally illustrated in FIG. 1. The two hydrophone segments could then be affixed in opposed relation with bolts such as at 60 which hold the mounting blocks around the cable 10. Additional bolts 62 may be used to affix the side members to the mounting blocks such as 48. Indeed a single side member could replace 48 and 52, otherwise clamps or the like might be used. Thus, each hydrophone assembly might be constructed of disassemblable parts and be adapted for enclosure within a water-tight sleeve which could be pulled over the assembly once it is in place on the streamer. The structures by which the hydrophone could be assembled onto the streamer will be obvious to those skilled in the art.

It will be noted in FIG. 4 that only a thin layer of elastomeric material 54 is disposed over the crystal 34. This elastomeric material could be molded together with side members 48 and 46 with molded in end portions such as at 63 to provide a closure which could be bolted directly to the mounting blocks in watertight fashion. Of course the entire hydrophone assembly, once in place could also be covered with a molded water and oil unpermeable sheath such as at 65, but in such a structure it would be necessary to rupture the sheath to disassemble the hydrophone from the cable. As stated above sheath 65 may be a pull-over watertight sleeve which can be placed over each hydrophone assembly when it is in place on the streamer.

In another variation a streamer cable might be constructed with suitable recesses interspersed along its length which might accommodate hydrophone assemblies such as illustrated in FIG. 1. Such a construction would yield a single uniform diameter hydrophone streamer wherein the individual hydrophone units could be taken off and replaced at will.

It is important that it be understood that the instant invention provides a piezoelectric crystal hydrophone of improved sensitivity by employing a construction wherein increased diameter crystals may be used without unduly increasing the size of the hydrophone or of the streamer cable. This invention makes possible the premanufacture of a streamer structure and subsequent assembly of hydrophones on that streamer structure in accordance with the needs of a particular survey. Moreover repair or replacement of streamer structures can be more readily accomplished without necessitating complete disassembly and overhaul of the streamer structure. It will further be appreciated that while certain representative embodiments and details hereof have been shown for purpose of illustrating this invention, it will be apparent to those skilled in the art that the hydrophone assemblies as provided herein may be variously modified without departing from the spirit or scope of this invention.

What is claimed is:
1. A hydrophone streamer assembly comprising:
an elongated streamer cable;
at least one piezoelectric crystal transducer for detection of underwater waves,
said crystal comprising a segment of a cylinder; and
means mounting said crystal with respect to said cable with the cylindrical axis of said crystal disposed in a transverse relation to the axis of said cable, said means supporting said crystal to define a void beneath the curved surface of the crystal.
2. The hydrophone streamer assembly of claim 1 wherein the radius of said segment of said cylinder is greater than the greatest radius of said hydrophone streamer assembly.
3. The hydrophone streamer assembly of claim 1 wherein said crystal is the segment of a circular cylinder.
4. The hydrophone streamer assembly of claim 1 wherein said means mounting said crystal includes means to hold two crystals in opposed relation with the convex surfaces of the crystal disposed outwardly of said streamer cable.
5. The hydrophone streamer assembly of claim 1 wherein said streamer cable is a central stress member streamer cable.
6. The hydrophone streamer assembly of claim 5 wherein said transducer comprises a pair of piezoelectric crystals disposed in opposing relation with their convex surfaces facing exteriorly of said cable.
7. The hydrophone streamer assembly of claim 6 wherein said means mounting said crystals includes two mounting blocks adapted to be mounted exteriorly of said central stress member streamer, said mounting blocks having means therein to support said crystals to define a void beneath the curved surface of the crystal.
8. The hydrophone streamer assembly of claim 6 including means to removably affix said mounting blocks in opposed relation about the exterior or said central stress member streamer.
9. The hydrophone assembly of claim 7 wherein each of said mounting blocks comprises a member comprised of rigid material having an elongated recess terminating in diverging crystal support surfaces, and wherein the edges of said crystal are on said diverging crystal support surfaces.
10. The hydrophone streamer assembly as recited in claim 9 including substantially rigid side members interfitting with said mounting blocks on either side of said crystal, and further including means enclosing and sealing the convex surface of said crystal comprising elastomeric water impervious material.
11. The hydrophone streamer assembly of claim 10 including means removably securing said side members to said mounting blocks and to said central stress member streamer.
12. A hydrophone streamer assembly comprising:
an elongated streamer cable;
at least one piezoelectric crystal transducer to detect reflected seismic waves,
said crystal comprising a segment of a cylinder having first edge surfaces generally parallel to the axis of said cylinder and second edge surfaces generally transverse to said axis; and
means mounting said crystal with respect to said cable with the cylindrical axis of said crystal transverse to the axis of said cable, said means supporting said crystal solely on said first edge surfaces to provide a void beneath the curved surface of said crystal.
13. The hydrophone streamer assembly of claim 12 wherein said crystal is a segment of a circular cylinder.
14. The hydrophone streamer assembly of claim 12 wherein said cable is a central stress member cable and including means removably securing said means mounting said crystal to said central stress member of said cable.
15. The hydrophone streamer assembly of claim 14 wherein said means mounting said crystal includes mounting blocks comprised of rigid material and adapted to be mounted exteriorly of a central stress member of said streamer cable and having recesses therein terminating in diverging crystal support surfaces, which abut and support said first edges of said crystal.

16. The hydrophone streamer assembly of claim 15 including means sealing said crystal and said mounting block, said means including an elastomeric portion disposed over the outer surface of said crystal to permit crystal response from underwater waves.

17. In a hydrophone streamer assembly including an elongated streamer cable having curved piezoelectric crystals which are cylindrical crystal segments mounted with respect thereto, said crystals being adapted to detect reflected seismic waves, the improvement comprising:

means supporting said curved crystal solely from the edges of said cylindrical crystal segment generally parallel to the axis of said cylindrical crystal segment.

18. A hoop stressed hydrophone for attachment to elongated seismic streamers and the like; said hydrophone comprising at least one substantially rigid mounting block having a recess along the length thereof to permit mounting of said block around a central stress member of said streamer, an elongated piezoelectric crystal comprising a segment of a cylinder being retained by said mounting block with the axis of curvature of said crystal disposed in transverse relation to the axis of said recess, said crystal cooperating with said mounting block to define a void beneath the curved surface of the crystal, and means enclosing and sealing said mounting block and said crystal including elastomeric means covering the exterior surface of said crystal.

19. The hydrophone of claim 18; wherein said means enclosing and sealing said mounting block includes a pair of side members interfitting with said support block and cooperating therewith to define a generally cylindrical external configuration.

20. The hydrophone of claim 18 including a pair of opposed mounting blocks adapted to mount two crystals in opposed relation on opposite sides of said stress member and means removably securing said mounting blocks together and to said stress member.

21. The hydrophone of claim 20; including side members interfitting with said mounting blocks and defining a generally cylindrical external configuration with said mounting blocks and said means enclosing and sealing said mounting blocks.

* * * * *